United States Patent [19]

Mendelson

[11] 3,713,298
[45] Jan. 30, 1973

[54] NAVIGABLE DAM

[76] Inventor: Morris Mendelson, 16156 Axley, Southfield, Mich. 48075

[22] Filed: June 7, 1971

[21] Appl. No.: 150,426

[52] U.S. Cl. ................................................. 61/30
[51] Int. Cl. ............................................. E02b 7/02
[58] Field of Search ........................... 61/30, 1-6, 8

[56] References Cited

UNITED STATES PATENTS

| | | | |
|---|---|---|---|
| 3,491,023 | 1/1970 | McCormick | 61/1 R X |
| 3,234,123 | 2/1966 | Hinde | 61/1 R X |
| 3,293,861 | 12/1966 | Hinde | 61/1 R |
| 3,492,822 | 2/1970 | Josephs | 61/1 R |

Primary Examiner—David J. Williamowsky
Assistant Examiner—Philip C. Kannan
Attorney—Hauke, Gifford and Patalidis

[57] ABSTRACT

A portable navigable dam for impeding or directing the flow of water without interfering with the use of the upper surface of the water such as for instance passage of sailing vessels. The navigable dam takes the form of a number of elongated tubular structures and in the preferred embodiment of this invention these are disposed on or near the bottom of a body of water generally paralleling the boundary between salt water and fresh water bodies. Each of the tubular structures has elongated openings formed in its upper surface for releasing air from within the tubular structure at a high rate, while preventing entry of water therethrough. The release of air into the water results in a pumping action that moves a very large volume of water upwardly in a relatively short time, forming a curtain of water which impedes the movement of the salt water into the fresh water. A method incorporating the navigable dam for directing tidal waters in a desired direction is also disclosed.

2 Claims, 4 Drawing Figures

NAVIGABLE DAM

BACKGROUND OF THE INVENTION

1. Field of the Invention

The present invention relates to a navigable dam and more particularly a method of using such a dam to impede or direct the flow of water without interfering with other uses of the water.

2. Description of the Prior Art

Along the coast line of the oceans and seas of the world there exist innumerable fresh water streams, bays, rivers and the like which flow into the salt water of the ocean or sea. Many of these fresh water outlets are becoming salt water lakes and rivers due to the intrusion of salt water as a result of tidal action. The accumulation of salt in the fresh water bodies has an enormous effect on the ecology of such fresh water bodies, particularly in destroying fresh water animal and plant life. In order to impede the amount of salt water entering into such fresh water bodies it has been proposed in the past to provide dams separating the two bodies of water. However, the use of dams has several drawbacks; first, it would represent an enormous expense not justified by the gains of limiting the amount of salt water intrusion into fresh water bodies. Secondly, many of the fresh water lakes and rivers flowing into the ocean are used for shipping purposes and the damming of these waterways, in addition to being highly impractical, would prevent the passage of sailing vessels into the inland bodies of water.

It would, therefore, be desirable to provide a navigable dam which impedes the passage of salt water into the fresh water bodies, while at the same time permitting the free unrestricted passage of sailing vessels thereacross.

Other uses for a navigable dam of this type would also be apparent. Such a dam could be used wherever it is desirable to impede or direct water flow without interfering with other uses of the water.

SUMMARY OF THE INVENTION

The present invention which will be described subsequently in greater detail comprises one or more water curtains which can be used to separate bodies of water either from each other or to divide a body of water into several parts without interfering with other uses of the water. An important use for such water curtains would be to provide them generally parallel to the boundary between salt water and fresh water bodies for impeding the intrusion of salt water into the fresh water bodies, while permitting the free passage of sailing vessels thereover.

The air curtains are formed by connecting a source of air under pressure to a plurality of tubular structures disposed at or near the bottom of the body of water. The tubular structures are provided with openings on their upper surface to permit escape of air. If sufficient air is discharged through the openings as it travels to the upper surface of the water, it will produce a water curtain which will impede horizontal flow of the water.

It is, therefore, an object of the present invention to provide a navigable dam and a method of using the dam to impede and control the flow of water, such as the flow of salt water into fresh water bodies.

Other objects, advantages and applications of the present invention will become apparent to those skilled in the the art of such dams when the accompanying description is read in conjunction with the accompanying drawing.

BRIEF DESCRIPTION OF THE DRAWING

The description herein makes reference to the accompanying drawing wherein like reference numerals refer to like parts, and in which.

DESCRIPTION OF THE PREFERRED EMBODIMENT

Figure 1:
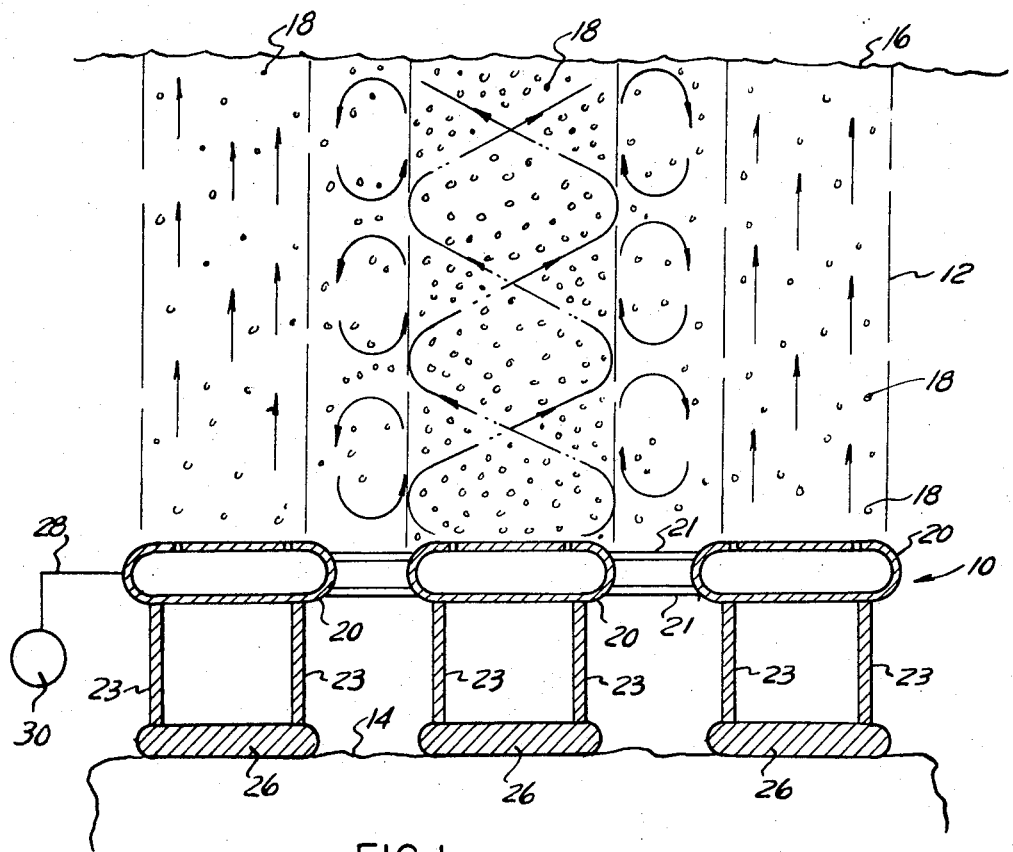
FIG. 1 is a schematic illustration of a portion of a navigable dam incorporating the features of the present invention and illustrating portions of the invention in cross section.

Referring to FIG. 1 there is illustrated a navigable dam 10 comprising a curtain of water 13 formed by the upward flow of a column of water generated by a suitable pumping action at the bottom 14 or at any desired intermediate level between the bottom of the body of water 16 and the surface thereof. In the preferred embodiment, the pumping action is generated by air bubbles 18 being emitted at the bottom 14 of the body of water 16 from a large number of round or elongated tubular air carrying structures 20, which effect an uplift to the water at a rate which is dependent upon the amount of air emitted from the tubular structures 20. While only three of the tubular structures 20 are shown in FIG. 1 and these are fastened together by cross pieces 21, it is apparent that it will be necessary to provide a large number of such tubular structures and that they could, if preferred, be entirely independent from each other.

Figure 2:
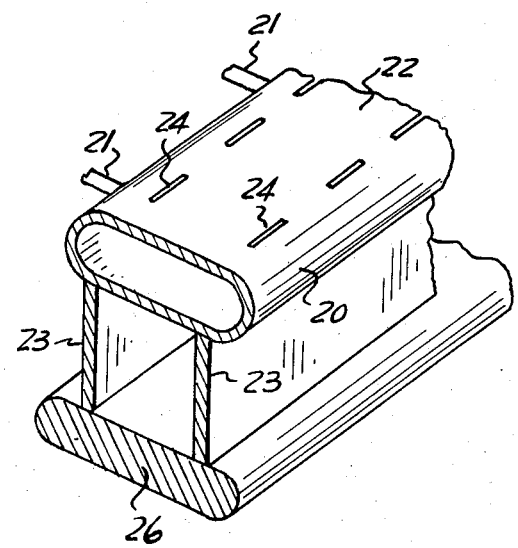
FIG. 2 is a perspective view of a portion of the preferred structure shown in FIG. 1.
Figure 3:
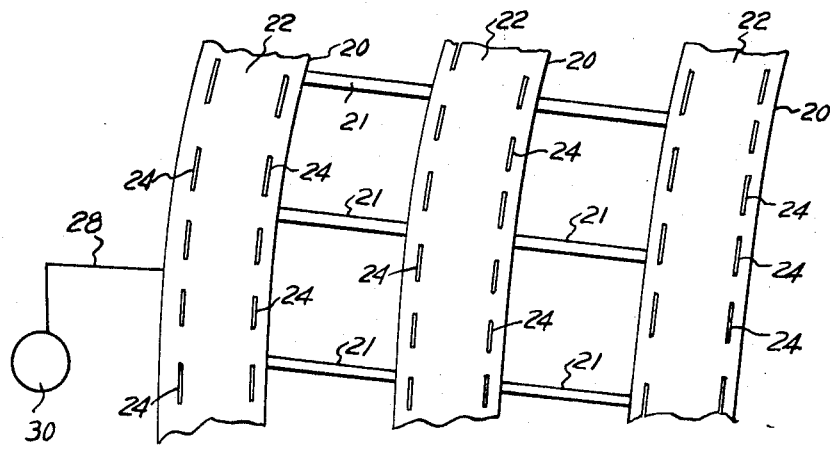
FIG. 3 is a top fragmentary view of a portion of the structure shown in FIG. 1.

Each of the tubular structures 20 has an elongated upper surface 22 as can best be seen in FIGS. 2 and 3 which in the particular structure used to illustrate the invention is approximately 2 feet wide. The length of the tubular structures will, of course, depend upon the length of the dam. The upper surface 22 includes a plurality of elongated openings 24 which act as valves to permit air to be exhausted from the interior of the tubular structure 20, while preventing the admission of water into the interior thereof. Although a weighted bottom portion 26 is shown as being affixed to the underside of the tubular structure 20 by struts 23 to insure that the tubular structure 20 remains near the bottom of the water 16 at a desired location and in an upright fashion, it is apparent that in some situations it might be desirable to have the tubular structures 20 directly on the bottom or spaced upwardly from the bottom a distance more or less than that shown in the drawings, and in such situations the weight 26 might not be necessary or the struts 23 will be longer or shorter as required.

The interior of at least one of the tubular structures 20 is connected through a suitable conduit 28 to a motor driven compressor 30 on shore which supplies a sufficient volume of air to impart the desired pumping action to the water 16. Although in FIGS. 1 and 3 only the connection between the compressor 30 and the interior of one of the tubular structures 20 is shown, it is to be understood that the compressor 30 must be connected in some manner to the interiors of each of the tubular structures 20. This can be accomplished by a connection similar to conduit 28 connecting tee compressor 30 with each of the tubular structures 20, or it can be done by connecting the compressor 30 to one of the tubular structures 20 and then connecting the tubular structures 20 together in series.

As the air is pumped into the interior of the tubular structures 20 and emitted through the openings 24, air bubbles 18 will rise upwardly through the water 16 carrying water upwardly therewith. The vertical flow conditions produced by the air emitted from the tubular structures 20 will depend upon the uplift velocity of the air. Tubular structures similar to those shown have been used to provide a system for aerating impounded water supplies to reduce entrophication. Use of these structures for this purpose has provided data which is helpful in constructing a navigable dam in accordance with the present invention. For instance, it has been found that a turbulent uplift like that shown above the middle tubular structure 20 of FIG. 1 will result when the air is directed upwardly at a rate of approximately 1.5 fps. A laminar uplift like that above the outside tubular structures 20 of FIG. 1 has been found to result at velocities of less than 1 fps. The turbulent uplift provides the better curtain but, because it also produces maximum friction, it requires more power to produce than the laminar uplift. It might be desirable than, where sufficient power to produce a turbulent uplift is not available or not practical, to use a system consisting of more tubular structures 20 but in which the air velocity is such that a laminar uplift is produced.

As the water proximate the bottom 14 rises upwardly in column fashion, it is replaced by water remaining at the bottom 14, resulting in a pumping action which moves a large volume of water upwardly to the surface in a relatively short time. For example, in one preferred construction in a channel 15 feet deep, delivering a predetermined amount of air to a 1,000 foot length of tubular structure having a 2 foot wide upper surface 22 will cause 86.4 million gallons of water per hour to be lifted, that is a 2 foot wide column of water 1,000 foot long will rise vertically at a rate of 1.6 foot per second.

The number of such tubular members necessary to produce the curtain of water sufficient to produce a navigable dam will, of course, depend upon a number of factors. The depth of the water and its horizontal velocity at the point where the dam is to be constructed are the most important factors to be considered. The velocity of the water moved vertically by the air being pumped through the tubular members must exceed the maximum velocity of the water in a horizontal direction as caused by currents or tides. The vertical velocity will, of course, diminish by reason of friction and thus the depth of the water is important. The requirements, however, can be readily computed by well known mathematical formulas so this offers no real problem to the utilization of the present invention.

The navigable dam 10 which has been described has other important uses of course but when it is utilized to prevent the intrusion of sea water it will be activated during incoming tidal periods to act as a wall impeding the upstream flow of salt water into the fresh water portion, while at the same time vessels can still sail across the dam 10 without interference.

Figure 4:
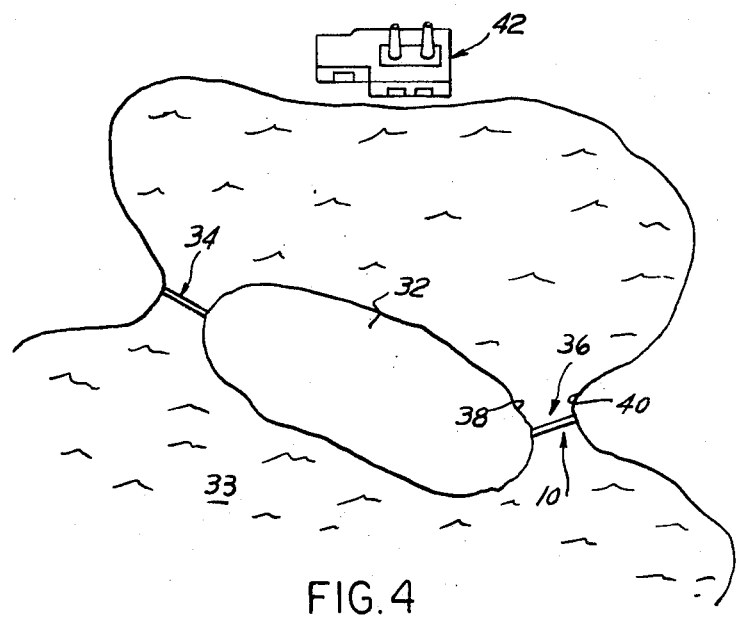
FIG. 4 is a schematic illustration of a method for using the navigable dam illustrated in FIGS. 1–3.

Referring to FIG. 4 wherein there is illustrated a method of utilizing the navigable dam 10 to direct tidal waters in a desired direction, there is schematically illustrated an inland body of water 32, which may be fresh or salt water, connected to a larger body of water 33, such as the ocean, by channels 34 and 36. The navigable dam 10 extends across channel 36 between the opposite shorelines 38 and 40. During high tide when water is coming into the inland body of water 32 through the channels 34 and 36, the navigable dam 10 is inoperative thus water from the larger body of water 33 enters the inland body through both channels 34 and 36. When the tide lowers during the latter part of the day, the dam 10 is activated so as to limit the amount of flow of water therethrough from the body of water 32 to the body 33 and the water will follow the path of least resistance, and therefore will recede from the body 32 through the channel 34.

The control of the direction of the flow of water in this manner has particular application wherein certain industrial plants, sewage disposal plants and the like are provided near the dam channel 34, such as schematically illustrated at 42. By directing the flow of water due to the tidal effect in this manner, a fresh supply of water will be directed past the disposal plant and it will carry the waste discharge therefrom out to sea, insuring a more effective removal as compared to the results obtained by permitting unrestricted flow through both channels 34 and 36 as would be the normal situation.

In this embodiment the navigable dam 10 acts as a valve in a tidal pump. In this pump, energy to lift water is supplied by the tide and the valve action is provided by the navigable dam.

The nature of the dam 10 is also such that it can be constructed of materials light enough to make it completely portable. This, of course, adds considerably to its usefulness in that it can be transported to a point of use and when it is no longer needed in that area it can be removed and transported to a new point of use.

It is apparent then that although several embodiments and uses of the present invention have been disclosed, that other forms of the invention may be adapted without departing from the spirit of the invention as defined by the scope of the appended claims.

What is claimed is as follows:

1. A method of directing tidal waters in a desired direction between a large body of salt water and an enclosed body of water having at least two separate channels connecting one body of water to the other, comprising:
   permitting an unrestricted flow of salt water into the enclosed body of water through both channels during an incoming tide; and
   impeding the flow of salt water through the one of said channels during an outgoing tide, while permitting an unrestricted flow of water from the enclosed body of water through the other of said channels.

2. The method as defined in claim 1 and in which impeding the flow of salt water is accomplished by providing means generating an upward flow of water across said channel at a velocity sufficient to impede flow of water through said channel.

* * * * *